June 5, 1923.
W. L. ISBILLS
FRICTION WHEEL
Filed July 1, 1922
1,457,525
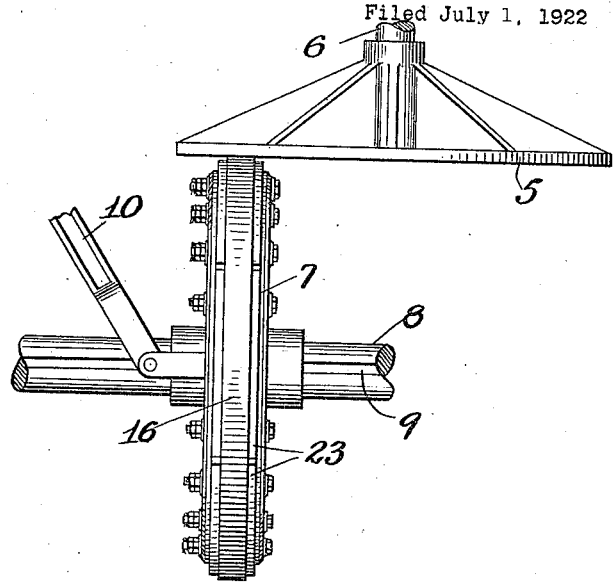
Fig. 1,
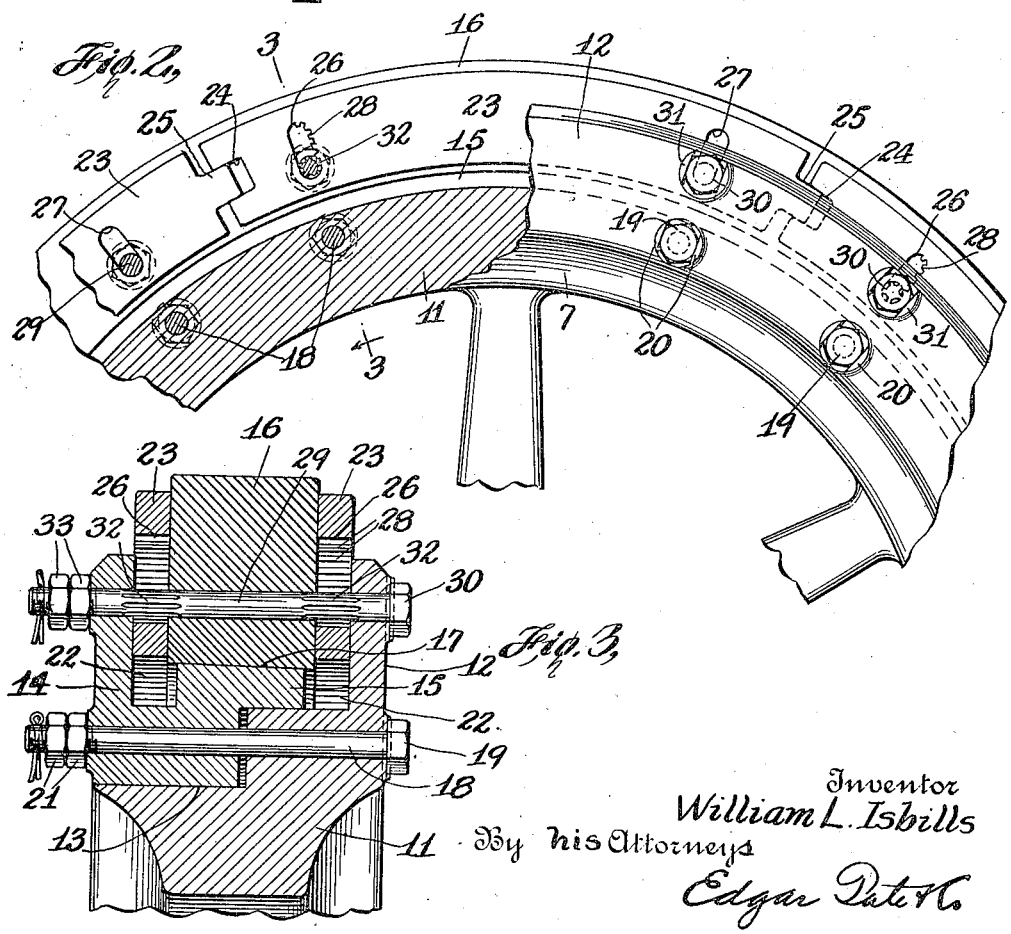
Inventor
William L. Isbills
By his Attorneys
Edgar Pate & Co.

Patented June 5, 1923.

1,457,525

UNITED STATES PATENT OFFICE.

WILLIAM L. ISBILLS, OF ELIZABETH, NEW JERSEY.

FRICTION WHEEL.

Application filed July 1, 1922. Serial No. 572,283.

*To all whom it may concern:*

Be it known that I, WILLIAM L. ISBILLS, a citizen of the United States, and residing at Elizabeth, in the county of Union and State of New Jersey, have invented certain new and useful Improvements in Friction Wheels, of which the following is a specification, such as will enable those skilled in the art to which it appertains to make and use the same.

This invention relates to friction wheels and particularly to wheels of this class used as drive or transmission wheels for motor vehicles, and the object of the invention is to provide an improved mounting for the friction facing of wheels of this class whereby the life of such facing may be materially extended by adjusting certain parts of the mounting therefor; a further object being to provide means for holding the friction facing in proper position at all times under slight pressure or tension; a still further object being to provide means for adjusting the movable parts of the mounting without dissecting or detaching said parts; and with these and other objects in view the invention consists in a wheel of the class and for the purpose specified which is simple in construction, efficient in use and which is constructed as hereinafter described and claimed.

This invention is an improvement on that described and claimed in a prior application filed by me February 25, 1922, Serial No. 539,147, and is fully disclosed in the following specification, of which the accompanying drawing forms a part, in which the separate parts of my improvement are designated by suitable reference characters in each of the views, and in which:—

Fig. 1 is a diagrammatic view of a friction transmission drive showing my improved friction wheel in operative position;

Fig. 2 an enlarged side view of a part of the friction wheel with parts of the construction broken away and in section; and, Fig. 3 a partial section on the line 3—3 of Fig. 2 and on an enlarged scale.

In Fig. 1 of the drawing, I have shown for the purpose of illustrating one form of my improved friction wheel or method of using the same, the two friction drive elements of a motor vehicle and in said figure 5 represents the usual drive wheel mounted upon the shaft 6 propelled by the engine of the vehicle, and at 7 I have shown my improved friction wheel slidably mounted upon a shaft 8 and keyed thereto by a key construction 9, the friction wheel 7 being operated through a suitable lever 10 in the usual or any desired manner.

The friction wheel 7, or the rim portion 11 thereof, is of the cross section shown in Fig. 3 of the drawing, the outer face or periphery portion of the rim being provided at one side thereof with a projecting flange 12 in the form of a comparatively thin plate, and the other side portion of the rim is cut out as shown at 13 from the approximate central portion of the rim outwardly, as clearly shown in Fig. 3 of the drawing. An annular ring or plate member 14 of approximately the same form in cross section as the projecting flange 12 of the rim 11 is adapted to be mounted in connection with the recessed side of the rim, and said ring or plate member is provided centrally thereof with an outwardly and laterally projecting part 15 forming a seat for a friction facing ring or member 16, and the outer face of the part 15 is tapered from left to right as shown at 17 and the inner face of the friction facing ring or member 16 is tapered to sit upon the part 15, and it will be noted that the laterally projecting portion of the part 15 bears upon a rim 11 of the wheel to reinforce and strengthen said part 15.

A plurality of bolts 18 are employed for holding the ring or plate member 14 in connection with the rim 11, the heads 19 of said bolts being held against rotation by projecting members 20 on the rim 11, as clearly shown in Fig. 2 of the drawing and two nuts 21 are preferably employed for retaining the member 14 in position.

The transverse dimension of the friction facing ring or member 16 is slightly greater than the projecting part 15 but is less than the distance between the flange 12 of the rim 11, and the ring or plate member 14 to form annular spaces 22 between said parts, as clearly shown in Fig. 3 of the drawing, and a plurality of adjustable arc-shaped plate members 23 are adapted to be mounted in the spaces 22 and adjustable radially of the wheel 7 in said spaces.

The arc-shaped plate members 23 are all of approximately the same construction and are provided at one end with notches or recesses 24 and at the other ends thereof with projecting tongues 25 which are adapted to enter the notches or recesses of adjacent members 23 when said members are mounted in position, and said plate members are provided, in the construction shown, and adjacent to the end portions thereof with elongated apertures 26 and 27, the aperture 26 in each plate member 23 being provided in one wheel thereof with projecting teeth 28, as clearly shown in Figs. 2 and 3 of the drawing, and bolts 29 are adapted to be passed through the elongated apertures 26 and 27 through the flange 12 of the rim 11 and the ring or plate member 14 for securing the parts together and for firmly holding the arc-shaped plate members 23 in any desired position of adjustment, said bolts passing through the friction facing 16. The heads 30 of the bolts 29 are held against rotation by projecting members 31 and the flange 12 and plate member 14, as clearly shown in Fig. 2 of the drawing.

The bolts 21 which are passed through the elongated apertures 26 of the arc-shaped plates 23 are provided with two gear faces 32 which are located in such position as to operate in connection with the gear teeth 28 in the elongated apertures 26 of the members 23, and by loosening the lock nuts 33 of the bolts 29 and moving the head 30 of said bolt out of engagement with the members 31 and by rotating said bolts in the proper direction, the arc-shaped plate members 23 may be moved inwardly and radially of the wheel 7 whenever it is desired to present a new facing for the friction ring or facing member 16, and this result can be accomplished without dissecting the parts of my improved friction wheel.

It will be understood that by reason of my improved construction fine adjustments of the arc-shaped plate members 23 may be produced, and it will be apparent that the adjustment of one plate member 23 will move the adjacent end portion of another plate member correspondingly by reason of the interlocking connection between said members, and when the plate members are secured in predetermined positions of adjustment by tightening the nuts 33 of the bolts 29, the gear faces 32 of said bolts will aid in retaining the plate members 23 against movement.

Another distinctive feature of my present invention consists in the tapering of the part 15 of the annular ring or plate member 14 so that as the plate member 14 is moved inwardly, the friction facing ring 16 is forced outwardly and radially of the wheel and is held in such position under tension so that at all times said friction facing may be held against free movement on the wheel, or the various parts thereof as well as to form a rigid and durable backing for said friction facing. In other words, the thrust is taken up directly through the part 15 and the rim 11 of the wheel relieving the strain upon the flange 12 and the ring or plate member 14.

It will also be apparent that while I have shown certain details of construction for carrying my invention into effect that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A friction wheel of the class described provided with a friction ring, means adjustably mounted on said wheel for reinforcing and supporting said ring and for extending the use of the friction facing thereof, and adjustable means adapted to operate upon the inner face of said friction ring for firmly holding and supporting said ring on said wheel.

2. A friction wheel of the class described provided with a friction ring, means adjustably mounted on said wheel for reinforcing and supporting said ring and for extending the use of the friction facing thereof, and adjustable means adapted to operate upon the inner face of said friction ring for firmly holding and supporting said ring on said wheel and for forming a rigid backing for said friction ring.

3. A friction wheel of the class described provided with a friction ring, means adjustably mounted on said wheel for reinforcing and supporting said ring and for extending the use of the friction facing thereof, adjustable means adapted to operate upon the inner face of said friction ring for firmly holding and supporting said ring on said wheel and for forming a rigid backing for said friction ring, and means for adjusting said first named means.

4. A friction wheel of the class described provided with a friction ring adapted to be mounted in connection with the rim portion of said wheel, means movably mounted on said rim and operating in connection with the inner face of said friction ring for firmly holding said ring in position and for forming a rigid backing for said ring, and means adjustable radially of said wheel and operating in connection with the side faces of said friction ring for extending the use of the friction facing of said ring.

5. A friction wheel of the class described provided with a friction ring adapted to be mounted in connection with the rim portion of said wheel, means movably mounted on said rim and operating in connection with the inner face of said friction ring for firmly holding said ring in position and for forming a rigid backing for said ring, means adjustable radially of said wheel and operating in connection with the side faces of said friction ring for extending the use of the friction facing of said ring, and means for adjusting said last named means.

6. A friction wheel of the class described provided with a friction ring adapted to be mounted in connection with the rim portion of said wheel, means movably mounted on said rim and operating in connection with the inner face of said friction ring for firmly holding said ring in position and for forming a rigid backing for said ring, means adjustable radially of said wheel and operating in connection with the side faces of said friction ring for extending the use of the friction facing of said ring, and means for adjusting said last named means and for holding the same in predetermined positions of adjustment.

7. A friction wheel of the class described provided with a friction ring adapted to be mounted in connection with the rim portion of said wheel, means movably mounted on said rim and operating in connection with the inner face of said friction ring for firmly holding said ring in position and for forming a rigid backing for said ring, means adjustable radially of said wheel and operating in connection with the side faces of said friction ring for extending the use of the friction facing of said ring, said means comprising a plurality of similarly formed arc-shaped plate members, means for interlocking the adjacent ends of said plate members, and means for moving said plate members radially of said wheel.

8. A friction wheel of the class described provided with a friction ring adapted to be mounted in connection with the rim portion of said wheel, means movably mounted on said rim and operating in connection with the inner face of said friction ring for firmly holding said ring in position and for forming a rigid backing for said ring, means adjustable radially of said wheel and operating in connection with the side faces of said friction ring for extending the use of the friction facing of said ring, said means comprising a plurality of similarly formed arc-shaped plate members, means for interlocking the adjacent ends of said plate members, and means for moving said plate members radially of said wheel and for retaining said plate members in different positions of adjustment.

9. A friction wheel of the class described comprising a rim provided at one side thereof with an integral projecting flange and on the other side thereof with a recess, an annular plate member mounted in connection with the recessed side of said rim, means for holding said plate member in position on said rim, said plate member being provided with a projecting part the outer face of which is tapered, and a friction ring adapted to be mounted on the tapered part of said plate member and the inner face of which is tapered to correspond with the taper in said part whereby said friction ring may be firmly held in position on the rim of said wheel.

10. A friction wheel of the class described comprising a rim provided at one side thereof with an integral projecting flange and on the other side thereof with a recess, an annular plate member mounted in connection with the recessed side of said rim, means for holding said plate member in position on said rim, said plate member being provided with a projecting part the outer face of which is tapered, a friction ring adapted to be mounted on the tapered part of said plate member and the inner face of which is tapered to correspond with the taper in said part whereby said friction ring may be firmly held in position on the rim of said wheel, the transverse dimensions of said friction ring being slightly greater than the corresponding dimensions of said projecting part but of less transverse dimensions than the distance between the inner faces of the projecting flange of the rim and said annular plate member to form annular recesses in the periphery of said wheel adjacent to the sides thereof, and a plurality of arc-shaped plate members mounted in said recesses and movable radially of said wheel.

11. A friction wheel of the class described comprising a rim provided at one side thereof with an integral projecting flange and on the other side thereof with a recess, an annular plate member mounted in connection with the recessed side of said rim, means for holding said plate member in position on said rim, said plate member being provided with a projecting part the outer face of which is tapered, a friction ring adapted to be mounted on the tapered part of said plate member and the inner face of which is tapered to correspond with the taper in said part whereby said friction ring may be firmly held in position on the rim of said wheel, the transverse dimensions of said friction ring being slightly greater than the corresponding dimensions of said projecting part but of less transverse dimensions than the distance between the inner faces of the projecting flange of the rim and said annular plate member to form annular recesses in the periphery of said wheel adjacent to the sides thereof, and a plurality of arc-shaped plate members mounted in said recesses and movable radially of said wheel, and the adjacent end portions of said arc-shaped plate members being interlocked.

12. A friction wheel of the class described comprising a rim provided at one side thereof with an integral projecting flange and on the other side thereof with a recess, an annular plate member mounted in connection with the recessed side of said rim, means for holding said plate member in position on said rim, said plate member being provided with a projecting part the outer face of which is tapered, a friction ring adapted to be mounted on the tapered part to correspond with the taper in said part whereby said friction ring may be firmly held in position on the rim of said wheel, the transverse dimensions of said friction ring being slightly greater than the corresponding dimensions of said projecting part but of less transverse dimensions than the distance between the inner faces of the projecting flange of the rim and said annular plate member to form annular recesses in the periphery of said wheel adjacent to the sides thereof, a plurality of arc-shaped plate members mounted in said recesses and movable radially of said wheel, and the adjacent end portions of said arc-shaped plate members being interlocked, and means passed through said projecting flange, annular plate member, friction facing, and said arc-shaped plate members for adjusting said arc-shaped plate members and for retaining said arc-shaped plate members in predetermined positions of adjustment.

13. A friction wheel of the class described the periphery of which is provided with projecting plate members, a friction ring mounted on said wheel between said plate members and spaced therefrom, a plurality of arc-shaped plate members mounted between said first named plate members and said ring and movable radially of said wheel, and means passed through said annular plate members, said ring and said arc-shaped plate members for moving said arc-shaped plates radially of the wheel.

14. A friction wheel of the class described the periphery of which is provided with projecting plate members, a friction ring mounted on said wheel between said plate members and spaced therefrom, a plurality of arc-shaped plate members mounted between said first named plate members and said ring and movable radially of said wheel, and means passed through said annular plate members, said ring and said arc-shaped plate members for moving said arc-shaped plates radially of the wheel and for retaining said arc-shaped plate members in predetermined position of adjustment.

15. A friction wheel of the class described the periphery of which is provided with projecting side plate members, a friction ring mounted on said wheel between said side plate members and spaced therefrom, a plurality of arc-shaped plate members mounted between said first named plate members and said ring and movable radially of said wheel the adjacent ends of said arc-shaped plate members being interlocked and the end portions of said arc-shaped plate members being provided with elongated apertures, the wall of one of which is provided with projecting teeth, and bolts passed through the elongated apertures of said arc-shaped plate members and through said annular plate members and said friction ring for retaining said arc-shaped plate members in different positions of adjustment.

16. A friction wheel of the class described the periphery of which is provided with projecting side plate members, a friction ring mounted on said wheel between said side plate members and spaced therefrom, a plurality of arc-shaped plate members mounted between said first named plate members and said ring and movable radially of said wheel the adjacent ends of said arc-shaped plate members being interlocked and the end portions of said arc-shaped plate members being provided with elongated apertures, the wall of one of which is provided with projecting teeth, bolts passed through the elongated apertures of said arc-shaped plate members and through said annular plate members and said friction ring for retaining said arc-shaped plate members in different positions of adjustment, and gear faces on the bolts passed through elongated apertures provided with projecting teeth whereby the rotation of said bolts will move said arc-shaped plate members radially of said wheel.

In testimony that I claim the foregoing as my invention I have signed my name this 29th day of June 1922.

WILLIAM L. ISBILLS.